(12) United States Patent
Ryan et al.

(10) Patent No.: US 7,377,224 B2
(45) Date of Patent: May 27, 2008

(54) APPARATUS AND METHODS FOR SEISMIC STREAMER POSITIONING

(75) Inventors: Sarah Elizabeth Ryan, Asker (NO); Rohitashva Singh, Houston, TX (US)

(73) Assignee: Western Geco L.L.C., Houston, TX (US)

( * ) Notice: Subject to any disclaimer, the term of this patent is extended or adjusted under 35 U.S.C. 154(b) by 273 days.

(21) Appl. No.: 11/127,568

(22) Filed: May 12, 2005

(65) Prior Publication Data

US 2006/0254490 A1    Nov. 16, 2006

(51) Int. Cl.
*B63B 21/66* (2006.01)
(52) U.S. Cl. ..................................... 114/244
(58) Field of Classification Search ............... 114/244, 114/245, 151; 440/38; 367/15–24
See application file for complete search history.

(56) References Cited

U.S. PATENT DOCUMENTS

| | | | | |
|---|---|---|---|---|
| 3,496,526 A | * | 2/1970 | Rockwell | ............... 367/17 |
| 3,541,989 A | * | 11/1970 | Leonard | ............... 114/245 |
| 4,315,476 A | * | 2/1982 | van der Tak | ............... 114/151 |
| 4,992,990 A | * | 2/1991 | Langeland et al. | ............ 367/19 |
| 6,189,475 B1 | * | 2/2001 | Coakley | ................ 114/245 |
| 6,477,111 B1 | | 11/2002 | Lunde et al. | |
| 6,671,223 B2 | | 12/2003 | Bittleston | |
| 6,985,403 B2 | * | 1/2006 | Nicholson | ............... 367/16 |
| 2006/0133200 A1 | * | 6/2006 | Tenghamn | ............... 367/17 |

FOREIGN PATENT DOCUMENTS

| | | |
|---|---|---|
| GB | 1164217 | 9/1969 |
| GB | 2 421 310 | 6/2006 |

* cited by examiner

*Primary Examiner*—Ed Swinehart
(74) *Attorney, Agent, or Firm*—Jeffrey L. Wendt; Liangang (Mark) Ye; Jeffrey E Griffin

(57) ABSTRACT

Apparatus and methods for positioning seismic streamers are described, one apparatus comprising a body, the body adapted to be connected to a seismic streamer, the body defining at least one flow passage there through, and a diverter adapted to selectively adjust flow through the flow passage. This abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 CFR 1.72(b).

24 Claims, 6 Drawing Sheets

APPARATUS AND METHODS FOR SEISMIC STREAMER POSITIONING

BACKGROUND OF THE INVENTION

1. Field of Invention

The present invention relates to the field of marine seismic instrumentation and methods of using same. More specifically, the invention relates to apparatus, systems, and methods for positioning seismic streamers.

2. Related Art

Marine seismic exploration investigates and maps the structure and character of subsurface geological formations underlying a body of water. For large survey areas, seismic vessels may tow one or more seismic sources and multiple seismic streamer cables through the water. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Previous attempts have not provided optimal positioning of marine seismic streamers, and further improvement is desired.

SUMMARY OF THE INVENTION

In accordance with the present invention, apparatus and methods are described for controlling position of seismic streamers that may be employed alone or in combination with other streamer positioning apparatus and methods. Apparatus and methods of the invention, which use forces generated by deflecting water through a duct, channel or tunnel, to move a streamer section, reduce or overcome problems with previous apparatus and methods.

A first aspect of the invention is an apparatus adapted to be able to move a streamer section, one apparatus embodiment comprising an external body, the external body having an inlet end, an outlet end, a longitudinal axis adapted to be generally parallel to a streamer axis, and a diameter larger than a diameter of the streamer. At least one flow-through duct is defined between the external body and an internal member, the internal member selected from a portion of the streamer and a connector between two streamer sections, the internal member extending from the inlet end to the outlet end, the flow-through duct fluidly connected to a normal flow outlet duct and a diversion flow outlet duct angled away from the longitudinal axis of the streamer, and including a controllable flow diversion member in at least one of the outlet ducts.

The external body may comprise an essentially hollow cylinder or other shape, such as oval, and a plurality of partitions extending inwardly form the body to the streamer, wherein the flow-through ducts are defined by cavities between the external body, the streamer, and the partitions. Alternatively, the flow-through ducts may be present as tunnels or channels in the external body itself, which case the body may be thicker. The body may be releasably secured to the streamer via mounting elements, such as clamps, and a clamp may be adjacent an inductor inside the streamer for supplying electricity to sensors, controllers, communications modules, and other components of the apparatus. Alternatively, one or more batteries may be operatively connected to components requiring power.

In a second apparatus embodiment, the apparatus is adapted to be connected inline between two streamer elements. In these embodiments the apparatus may include an internal body, which may be cylindrical, oval, or some other shape, having a first portion adapted to be connected to a first seismic streamer portion and a second portion adapted to be connected to a second seismic streamer portion, the first and second seismic streamer portions comprising a seismic streamer. The apparatus in these embodiments includes an external body, which also may be cylindrical, oval or some other shape, having a diameter larger than a diameter of the internal body, the external body connected to the internal body. In these embodiments, sensors, actuators, controllers and the like may be positioned in a cavity that would ordinarily be occupied by the streamer.

The flow diversion member may comprises a metal, plastic, or composite material flap operatively connected to the streamer or the body, and able to be moved in accordance with the desired amount of flow to be diverted through the diversion flow outlet duct. In apparatus embodiments comprising more than one flow-through duct, each flow diversion member may be adapted to move independently or in conjunction with the other flow diversion members. Both embodiments include the option of providing connections to the streamer that allow the body to rotate relative to the streamer, thus avoiding unnecessary twisting moments exerted on the streamer by the apparatus when it is commanded to divert flow through one or more flow diversion ducts. The body may take a cylindrical or any other shape as long as its essential function is maintained, and the inlet and outlet ends may be streamlined to reduce drag. Furthermore, one or more outlet ducts may include propulsion boosters, such as motor-driven impellers, to provide additional thrust to move a steamer.

A second aspect of the invention are methods of positioning streamers using an apparatus of the invention. Methods of the invention may comprise sensing position of the streamer, either with remote sensors or using sensors onboard the streamer and/or the apparatus. Depending on the control scheme utilized, if remote position sensors are used, they may signal a supervisory controller that in turn sends a command to a local controller associated with an apparatus of the invention, which then signals one or more actuators to move one or more diversion members. If local position sensors are relied on, the sensors may be used by local controllers directly, perhaps supervised by a supervisory controller, to actuate diversion members. Communication with the apparatus may be performed by telemetry selected from hard wire, wireless, and optical telemetry. Other methods of the invention comprise manipulating one or more of the diversion members to move the seismic streamer to a desired position, which may be any direction in 3-dimensions, for example lateral (horizontal), change of depth (vertical), or any direction in between these extremes. The desired position may be relative to another streamer. The other streamers may employ apparatus of the invention.

Apparatus and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
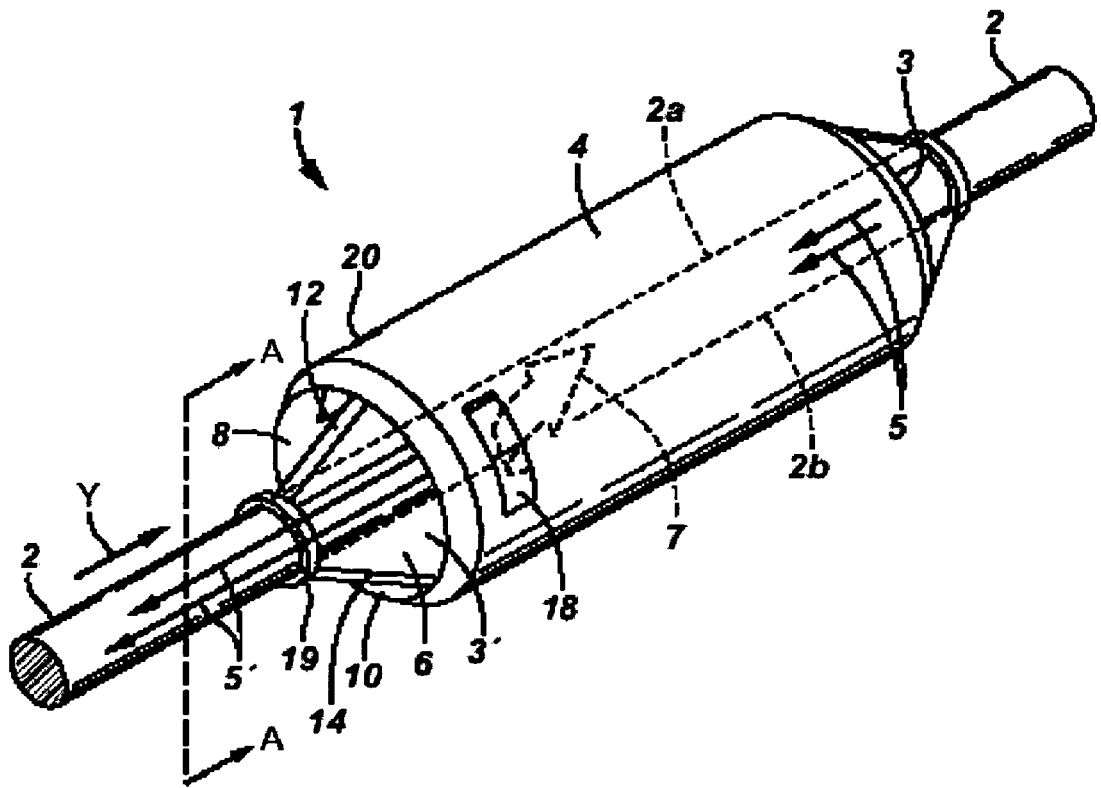
FIG. 1 is a schematic rear perspective view of a first apparatus of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, in the discussion herein, aspects of the invention are developed within the general context of controlled positioning of seismic streamers, which may employ computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced in whole or in part with other computer system configurations, including hand-held devices, personal digital assistants, multiprocessor systems, microprocessor-based or programmable electronics, network PCs, minicomputers, mainframe computers, and the like. In a distributed computer environment, program modules may be located in both local and remote memory storage devices. It is noted, however, that modification to the systems and methods described herein may well be made without deviating from the scope of the present invention. Moreover, although developed within the context of controlling position of seismic streamers, those skilled in the art will appreciate, from the discussion to follow, that the principles of the invention may well be applied to other aspects of seismic data acquisition. Thus, the systems and method described below are but illustrative implementations of a broader inventive concept.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention relates to various apparatus and methods for controlling position of marine seismic streamers. One aspect of the present invention relates to apparatus for controlling position ("positioning") of seismic streamers. Another aspect of the invention are methods for controlling position of seismic streamers, which may include methods for controlling distance between two seismic streamers, and methods for remotely controlling position of marine seismic streamers relative to a natural or man-made object.

The terms "controlling position", "position controllable", "remotely controlling position" and "steering" are generally used interchangeably herein, although it will be recognized by those of skill in the art that "steering" usually refers to following a more or less defined lateral path, while "controlling position", "position controllable", and "remotely controlling position" could include steering, but also vertical movements, and could mean merely maintaining a relative position, for example relative to one or more reference points, such as natural or man-made objects, or merely deflecting an object. As "position controllable" and "controlling position" are somewhat broader terms than "steering", these terms are used herein, except when specific instances demand using more specific usage.

In order to perform 3D and 4D marine seismic surveys, an array of marine seismic streamers, each typically several thousand meters long and containing a large number of hydrophones and associated electronic equipment distributed along its length, is towed at about 5 knots behind a seismic survey vessel, which also may tow one or more seismic sources comprising source members, typically air guns. Acoustic signals produced by the source members are directed down through the water into the earth beneath, where they are reflected from the various strata. The reflected signals may be received by the hydrophones in the streamers, digitized and then transmitted to the seismic survey vessel, where they may be recorded and at least partially processed with the ultimate aim of building up a representation of the earth strata in the area being surveyed.

A typical marine seismic streamer which may benefit form the apparatus and methods of the invention is made up of a large number of similar 100 meter streamer sections connected end-to-end, each section comprising a substantially cylindrical outer skin containing a pair of longitudinally extending strength members, typically ropes made of aramid fiber known under the trade designation KEVLAR™, to bear the towing forces. The hydrophones are substantially uniformly distributed along the length of the streamer section, and may be interspersed with cylindrical spacers and foam elements that are mounted on the strength members. The foam elements may be saturated in use with kerosene or a similar fluid to render the streamer section substantially neutrally buoyant. The streamer also may include electronics modules (or "bubbles") containing circuitry for digitizing the reflected signals detected by the hydrophones and transmitting the digitized signals to the seismic survey vessels, these modules typically being connected between adjacent streamer sections.

Another streamer which may benefit from the present invention comprises an elongate substantially solid core, at least one longitudinally extending strength member and a plurality of hydrophones embedded in the core, a polymeric outer skin surrounding the core and defining there around an annular space, and polymeric foam material adapted to be substantially saturated with liquid and substantially filling the annular space. The hydrophones may be encapsulated in capsules having at least one opening communicating with the annular space. The streamer may include a plurality of foam buoyancy elements, typically made from a skinned polymeric foam material such as skinned polypropylene foam, embedded in the core between the encapsulated hydrophones, and may further include a plurality of electronics modules each containing electronic circuitry for processing the signals produced by a plurality of the hydrophones, the electronics modules being embedded in the core between the hydrophones, along with electrical conductors for connecting the hydrophones to the electronics modules, electrical conductors for providing power to the electronics modules, electrical conductors for connecting the electronics modules to respective electro-optical conversion and multiplexing units connected in the streamer at intervals therealong, and one or more optical fibers for interconnecting the electro-optical conversion and multiplexing units.

Streamers may be towed at a depth of about 6 to 10 meters below the surface of the water by means of a "lead-in", a reinforced electro-optical cable via which power and control signals are supplied to the streamer and seismic data signals are transmitted from the streamer back to the vessel, the vertical and/or horizontal position of the streamer being controlled by orientation members, or "birds" distributed along the length of the streamer. Typically, the front end of the streamer is mechanically coupled to the lead-in by at least one vibration-isolating section (or "stretch section"), while the rear end is coupled to a tail buoy incorporating a GPS position measuring system, typically via another "stretch section". The major components of the streamer may be embedded in the core, the major components including uniformly longitudinally spaced encapsulated hydrophone assemblies, a pair of parallel, longitudinally extending, woven rope strength members (or "stress members") made for example from the aramid fiber known under the trade designation KEVLAR™, a plurality of electronics modules, typically one for every three of the hydrophone assemblies, disposed between the hydrophone assemblies, and wire and optical fiber bundles. The bundles may contain electrical conductors for connecting the encapsulated hydrophone assemblies to the electronics modules, and for conveying the digital output signals produced by the electronics modules along the streamer section, as well as additional electrical conductors for conveying electrical power and control signals along the streamer section and optical fibers. Additionally, a plurality of buoyancy elements (or "pills"), made of skinned polypropylene foam, may be molded into the core between the hydrophone assemblies and the electronics modules. The number and density of the buoyancy pills are selected such that their buoyancy effect, combined with that of the kerosene or other fluid in the foam material in the annular gap, renders the streamer section substantially neutrally buoyant in water: typically, the specific gravity of the buoyancy pills is about 0.6. The adjacent ends of the stress members at each end of the streamer sections may be joined together such that the members form a single continuous loop, the opposite ends of this loop being secured to respective mechanical terminations (not shown) forming parts of the end connectors of the streamer section. The electronics modules may comprise electronic circuitry for digitizing the respective output signals produced by each of the hydrophone assemblies, and for transmitting the digitized signals along the streamer section to cylindrical electronics units, or "bubbles", connected between some of the streamer sections. The circuitry of each electronics module may be disposed within a cylindrical metal container, preferably of aluminum, which serves to shield the circuitry from external electrical interference. The digitized hydrophone output signals may be converted into optical signals in the electronics bubbles, for multiplexing and high speed onward transmission via the optical fibers in the bundles to the vessel, where they are processed and recorded: thus it will be appreciated that the optical fibers serve to interconnect the electronics bubbles.

Another streamer that may benefit from the present invention has many features in common with the streamer section just described: a solid core coaxially surrounded by a polymeric outer skin which defines an annular gap around the core, the annular gap being filled with polyurethane foam saturated with kerosene or other low density fluid, the core having two longitudinally extending stress members embedded in it, along with encapsulated hydrophone assemblies and electronics modules. The wire and optical fiber bundles of the previous streamer section are replaced by two multi-conductor bundles connecting the encapsulated hydrophone assemblies to the electronics modules, a multi-conductor line connecting the outputs of the electronics modules to the aforementioned electronics "bubbles", a multi-conductor, multi-optical fiber main power and data bundle, and a multi-conductor bundle containing auxiliary power, control and data lines for connection to streamer orientation members ("birds") and acoustic streamer position sensing devices connected at intervals along the streamer. The bundles to are distributed across a space extending diametrically across the streamer section, with the stress members on one side of them. The generally cylindrical buoyancy pills of the previous streamer section are replaced by pills of the same material but generally semi-circular in cross section, disposed on the other side of the bundles and shaped to partly conform to them.

Apparatus and methods of the present invention are useful with the aforementioned described streamers to generate forces on the streamers. Apparatus of the invention include a body having an outside surface, an inlet end, an outlet end, and a longitudinal axis generally parallel to the streamer axis. The body may be clamped onto or otherwise fastened to the streamer, or connected inline between two streamer sections. The body has, or creates in conjunction with the streamer, one or more flow-through ducts, channels or tunnels generally parallel to the longitudinal axis of the streamer, having at least two outlets. Each flow-through duct fluidly connects to a normal flow outlet duct and a diversion flow outlet duct, wherein the apparatus includes a controllable flow diversion member in at least one of the outlet ducts that when actuated causes a change in the fluid volumes traversing through the normal outlet duct and the diversion flow outlet duct. If the change results in more fluid traversing through the diversion flow outlet duct, the streamer may move in the direction generally opposite to the diverted flow. If the change results in more fluid flowing through the normal flow outlet duct, the streamer will tend to move in an unchanged path. The inline versions of the apparatus have the advantage that power and telemetry may be provided by the streamer connectors, and the central space can be used to house the electronics (including sensors) and batteries. The clamp-on design, on the other hand, communicates through the streamer skin, and its electronics and batteries are stowed in the flow-through ducts. By changing the direction of flow of fluid through the device, forces are generated that can move the streamer towards a desired position in the sea. Multiple apparatus of the invention may be placed in the streamer configuration in order to either provide positioning force to deflect the streamer, or to augment forces provided by other streamer positioning devices, such as wings and birds. The electronics module inside the inventive apparatus may include a micro-controller based control system to be able to acquire and process data from one or more sensors that would sense the orientation of the inventive apparatus, and also provide control of the diversion members and other actuators necessary to maintain coherent control of the forces generated. To increase the capability of apparatus of the invention, it is also possible to place an impeller in the diversion flow exit duct to provide added speed to the water before it exits the duct. This will create a greater force, if that is desirable. The front intakes of the ducts of the device may be designed to contribute a minimum of drag, and may be arranged symmetrically so as to not produce any net lateral forces due to their shape.

Figure 2:
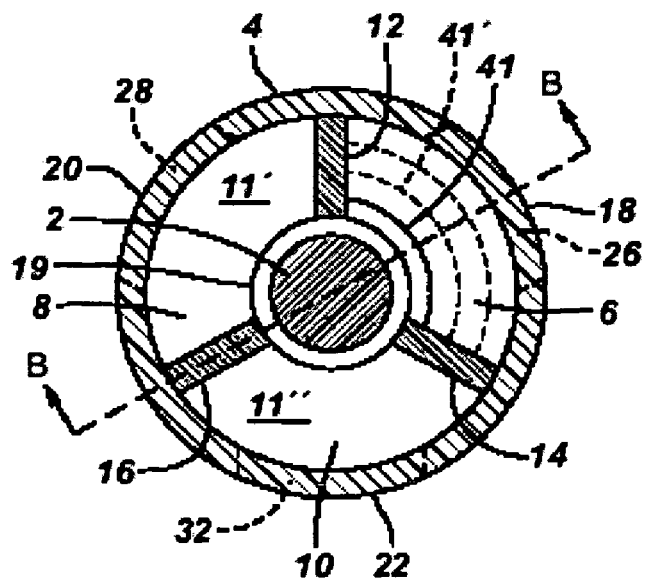
FIG. 2 is a cross-sectional view, taken along the line A-A of FIG. 1.
Figure 3:
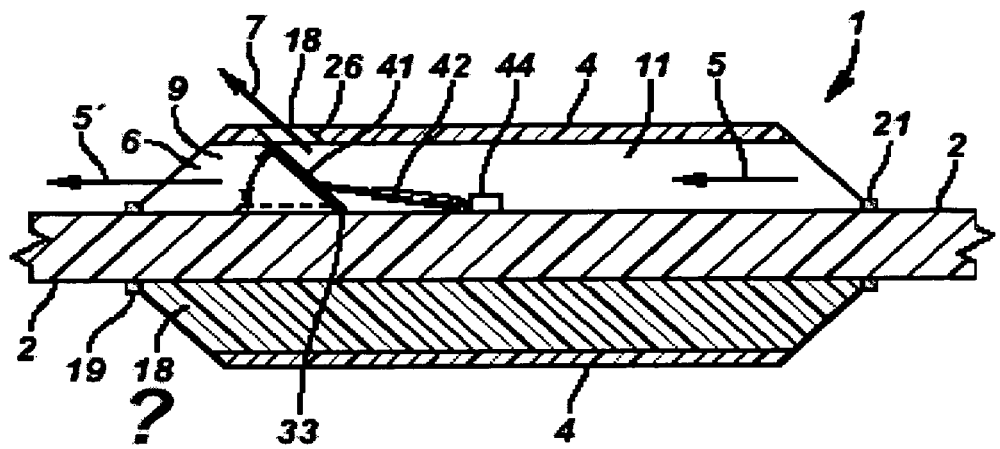
FIG. 3 is a cross-sectional view, taken along the line B-B of FIG. 2.

As an example, FIG. 1 illustrates a perspective view and FIGS. 2 and 3 cross-sectional views of one apparatus embodiment 1 of the invention. Identical reference numerals are used throughout the drawing figures when the same component or element is referred to in different figures. In this embodiment the apparatus of the invention is releasably secured to the outside of a streamer 2, illustrated partially in phantom by dotted lines 2a and 2b, and comprises a body 4, which may be cylindrical, having a front intake end 3, an exit end 3', and three partitions 12, 14, and 16 (the latter one not shown in FIG. 1, but viewable in the cross-sections illustrated in FIGS. 2 and 3). The arrows labeled 5 denote the direction of travel of water between body 4, partitions 12 and 14, and streamer 2, these forming a duct 11 (FIG. 3) generally parallel to the longitudinal axis of streamer 2. Streamer 2 and body 4 are traveling through the water in the direction indicated by the arrow Y. The arrows labeled 5' indicate fluid flowing out of the apparatus in generally the same direction as when it entered intake end 3, that is, non-diverted. Conversely, the phantom arrow 7 generally indicates diverted fluid flow, as will become more apparent in the view depicted in FIG. 3. Body 4 may be releasably secured to streamer 2 through suitable fastening means, such as circle clamps 19 and 21. Any fastener system maybe employed without departing from the invention, such as screws, rivets, flanges, welds, and the like, as long as the apparatus may be removed from the streamer when desired.

The perspective view of FIG. 1 illustrates three duct exits 6, 8, and 10 that allow fluid to flow essentially non-diverted through body 4. "Non-diverted" flow is also referred to herein as "normal" flow, in other words, straight through the apparatus essentially unchanged in direction. Duct exit 6 is one of two duct exits from duct 11 (FIG. 3), with a second duct exit being formed in body 4 at 18. Fluid diverted through a diversion flow outlet duct 26 and its exit 18 causes streamer 2 to move, as will be become apparent. A duct exit 8 at exit end 3' between partitions 12 and 16, and a duct exit 10 between partitions 14 and 16 also allow fluid to flow through the apparatus substantially non-diverted. Partition 16 is shown in FIGS. 2 and 3, but is obscured from view by streamer 2 in FIG. 1. Another diversion flow outlet duct 28 and duct exit 20 is depicted in FIG. 2, and a third diversion flow outlet duct at 32 and duct exit 22 are shown in FIG. 2. Diversion flow outlet ducts 28 and 32 and their respective duct exits 20 and 22 have similar function as diversion flow outlet duct 26 and duct exit 18, to move streamer 2.

FIGS. 2 and 3 illustrate two cross-sectional views of the apparatus of FIG. 1. A cross-sectional view along the section A-A of FIG. 1 is illustrated in FIG. 2, which illustrates a diversion member 41 adapted to divert some or all of the fluid flowing through duct 11 through diversion flow outlet duct 26 and duct exit 18. Dotted arcs 41' illustrated in FIG. 2 are possible positions of diversion member 41, as is apparent in FIG. 3, which is a cross-section taken along the line B-B of FIG. 2. As depicted more clearly in FIG. 3, diversion member 41 is moveable through a variable angle θ, which may range from 0 to an angle necessary to completely close off normal outlet duct 9, thus forcing all fluid flowing through duct 11 to flow through diversion flow outlet duct 26. Diversion member 41 may be connected to streamer 2 via a hinged connection 33 and moved by a piston/cylinder actuator 42 controlled via a local controller 44 that may communicate with a supervisory controller (not shown), with a human through a wireless transmission, or with some other remote device, such as the towing vessel. Piston/cylinder actuator 42 may be hydraulic or pneumatic. Similar diversion member-actuator-controller arrangements may be supplied in duct 11' (between partitions 12 and 16) and duct 11'' (between partitions 16 and 14) to force fluid through diversion ducts 28 and 32. In operation, only one or two diversion members may be diverting fluid flow, the others allowing fluid to traverse through non-diverted.

Figure 4:
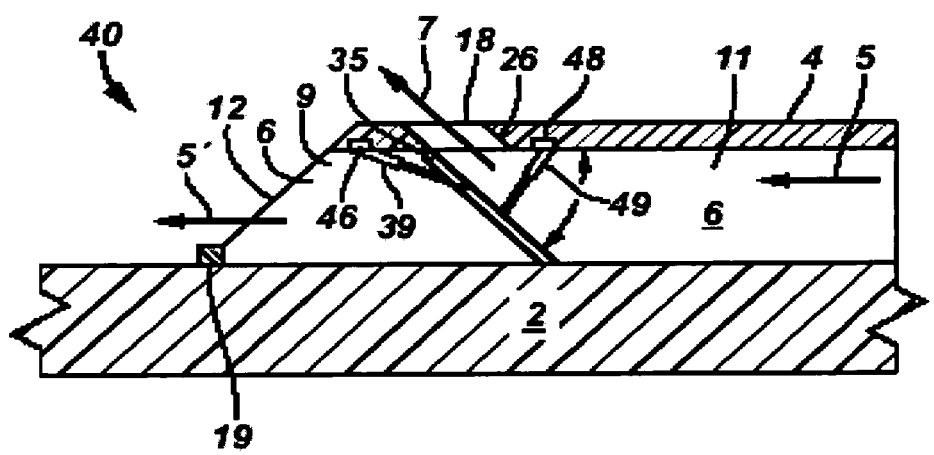
FIG. 4 illustrates a schematic cross-sectional view of an alternative apparatus embodiment of the invention, illustrating only the rear portion of the apparatus.

FIG. 4 illustrates a schematic cross-sectional view of an alternative apparatus embodiment 40 of the invention, illustrating only the rear portion of the apparatus, since the intake end is the same as with embodiment 1 of FIGS. 1-3. As before, fluid flows through duct 11 in the direction indicated by arrow 5, and may exit either through normal flow outlet duct 9, through diversion flow outlet duct 26, or partially through both outlet ducts, depending on the position of diversion member 41. The actuation of diversion member 41 in embodiment 40 is slightly different than the actuation of embodiment 1; in embodiment 40, two piston/cylinder type actuators 39 and 49 work in tandem to move diversion member 41 about a hinged connection 35, actuator 39 pushing and actuator 49 pulling during upward movement, and vice versa during downward movement, controlled by local controllers 46 and 48, respectively. When diversion member 41 is in the position indicated, all fluid from duct 11 is diverted through diversion flow outlet duct 26, and when diverting member 41 is moved upward as indicated by the arrow and phantom lines, some of the fluid from duct 11 will flow through normal outlet duct 9 and some through diversion flow outlet duct 26, until diversion member is fully raised and closes diversion flow outlet duct 26.

Figure 5:
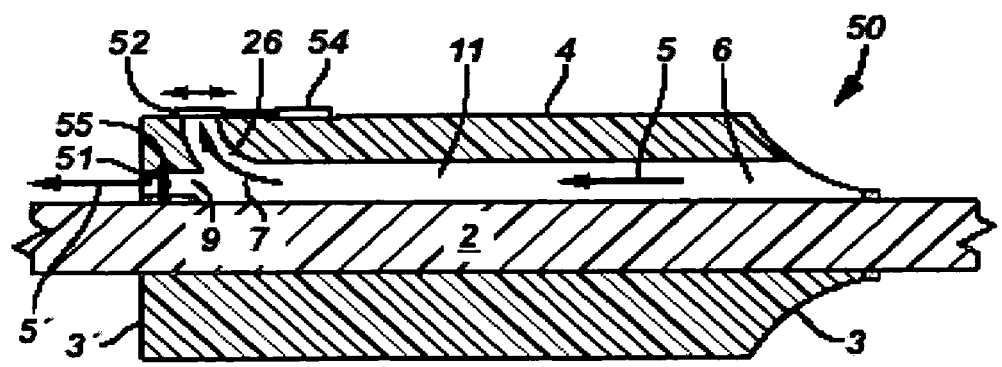
FIG. 5 illustrates in cross-section another apparatus embodiment of the invention.

FIG. 5 illustrates in cross-section another apparatus embodiment 50 of the invention. Embodiment 50 performs the same function as embodiments 1 and 40 previously described, but introduces some variations; for example, intake end 3 is shown having a more curved profile. In addition, diversion flow outlet duct 26 is depicted as having a slightly curved shaped, and fluid flow through diversion flow outlet duct 26 is controlled via a sliding plate valve 52 actuated by a piston/cylinder actuator 54. Flow through normal outlet duct 9 is controlled in this embodiment by a butterfly valve 51 or equivalent valve actuated by a suitable actuator 55. Actuators 54 and 55 may be controlled by one or more local controllers, not shown here for clarity. Another variation is that exit end 3' is illustrated as being generally perpendicular to the longitudinal axis of streamer 2.

Figure 6:
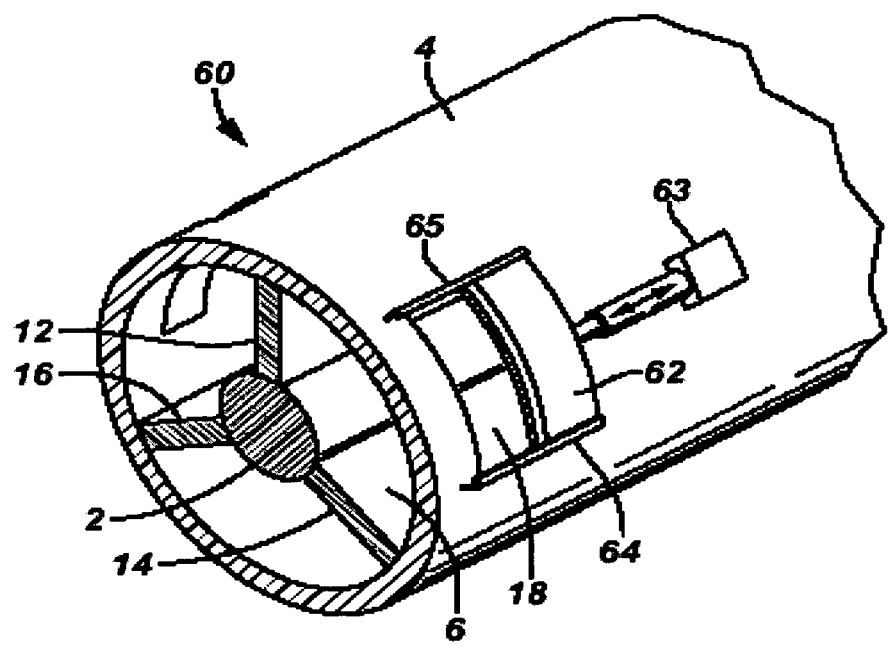
FIG. 6 is a schematic rear perspective view of another apparatus of the invention.

FIG. 6 illustrates a rear perspective view of an apparatus embodiment 60, illustrating in more detail a sliding plate valve comprising a curved plate 62 whose curvature is similar to the curvature of the outside surface of body 4. Curved plate 62 may slide in rails 64 and 65 mounted on the outside surface of body 4. Alternatively, curved plate 62 may slide within grooves formed in body 4, or a gearing arrangement may be used, or some other arrangement. In any case, an actuator 63, such as a piston/cylinder type actuator, or rack and pinion actuator, or equivalent function actuator may be employed to move curved plate 62 as depicted by the doubled-headed arrow in order to open and close duct exit 18 and divert fluid flow. Alternatives abound for these embodiments; for example, one skilled in the art would have no problem constructing a similar functioning slide valve comprising two curved plates, one moving upstream and one moving downstream when the valve is to open and flow diverted through duct exit 18. Another alternative would be to position rails 64 and 65 transversely rather than longitudinally as depict in FIG. 6, so that curved plate 62 slides in an arc motion. Combinations of these could also be envisioned.

Figure 7:
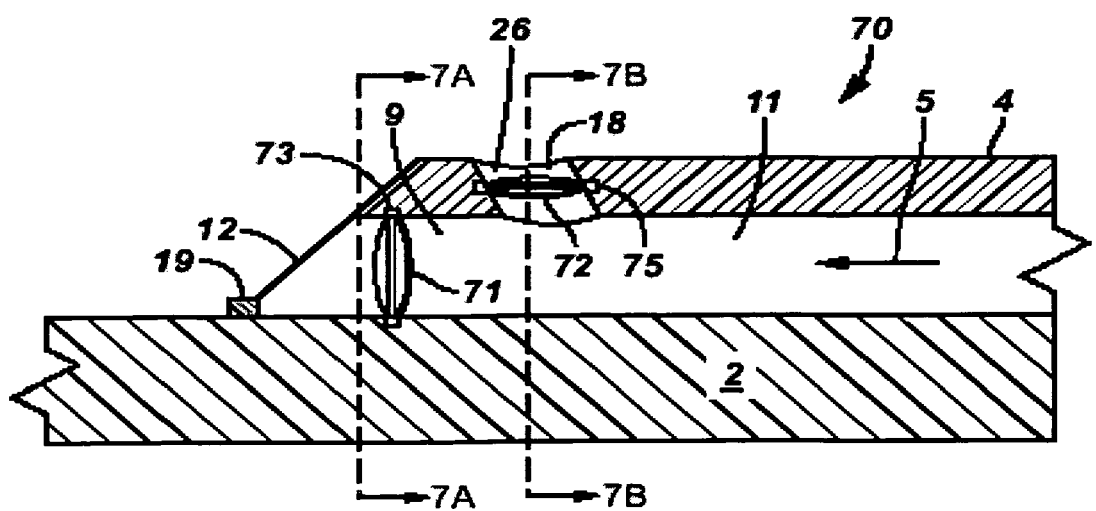
FIG. 7 illustrates a schematic cross-sectional view of another alternative apparatus embodiment of the invention, illustrating only the rear portion of the apparatus.
Figure 7A:
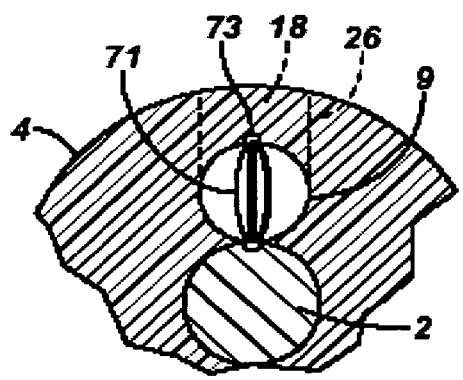
FIGS. 7A and 7B illustrate cross-sections taken along lines 7A-7A and 7B-7B, respectively, of FIG. 7.
Figure 7B:
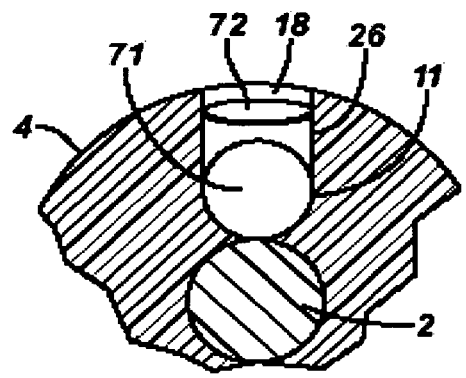

FIG. 7 illustrates a schematic cross-sectional view of an alternative apparatus embodiment 70 of the invention, illustrating only the rear portion of the apparatus, and only one of the duct systems. Once again fluid flows through duct 11 as indicated by arrow 5. A butterfly valve 72 may be mounted in diversion flow outlet duct 26, actuated by an actuator 75 controlled by a controller, not shown. A second butterfly valve 71 may be mounted in normal flow outlet duct 9, actuated by an actuator 73. It is apparent that many valve types could be employed. Valves 71 and 72 function to regulate fluid flow through normal flow outlet duct 9 and diversion flow outlet duct 26. In normal flow operation, when no streamer deflection is necessary, valve 71 is open and valve 72 closed. When it is desired to move streamer 2 in the direction that is downward in FIG. 7, valve 71 is closed partially and valve 72 opened at least partially to divert some of the fluid through diversion flow outlet duct 26. FIGS. 7A and 7B are cross-sections taken as shown in FIG. 7. FIG. 7A illustrates valve 71 in normal flow outlet duct 9 as open, while FIG. 7B illustrates valve 72 in the open state.

Figure 8:
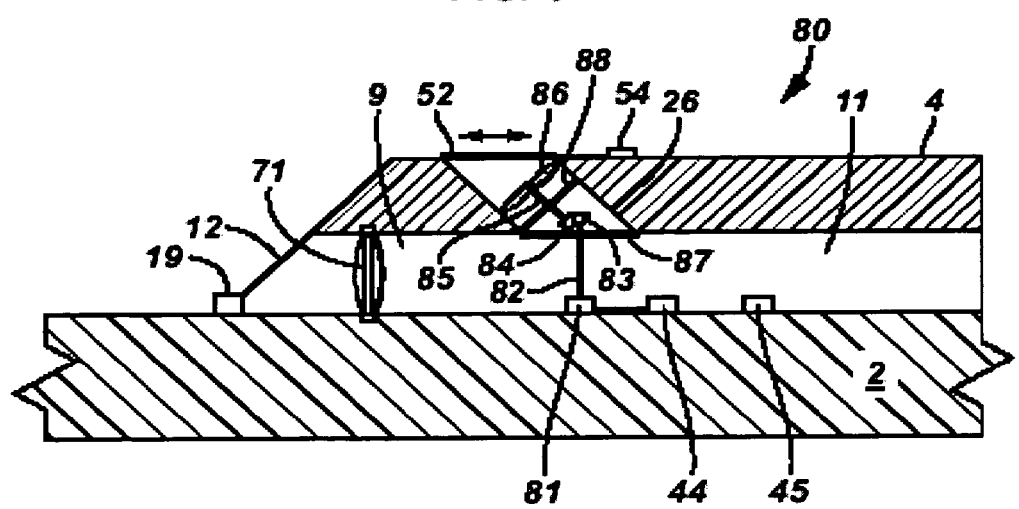
FIG. 8 illustrates a schematic cross-sectional view of another alternative apparatus embodiment of the invention, illustrating only the rear portion of the apparatus.

To increase the capability of apparatus of the invention to exert force on the streamer, it is also possible to place impellers in one or more diversion flow outlet ducts to increase the velocity of the fluid before it exits the diversion flow outlet ducts. Inclusion of impellers will create a greater force, if that is desirable. Such an embodiment is illustrated in FIG. 8, illustrating embodiment 80 in cross-section, showing only the upper rear portion of the apparatus. A motor 81 turns a first shaft 82 having a first bevel gear 83 attached thereto. Bevel gear 83 meshes with a second bevel gear 84, which is connected to a second shaft 85. Shaft 85 is in turn connected to an impeller 86. When slide valve 52 is open, and impeller 86 turning, with butterfly valve 71 closed, additional force may be exerted on streamer 2 above the force that might be exerted without impeller 86. Shafts 82 and 85 may be supported by brackets 87 and 88, respectively.

Figure 9:
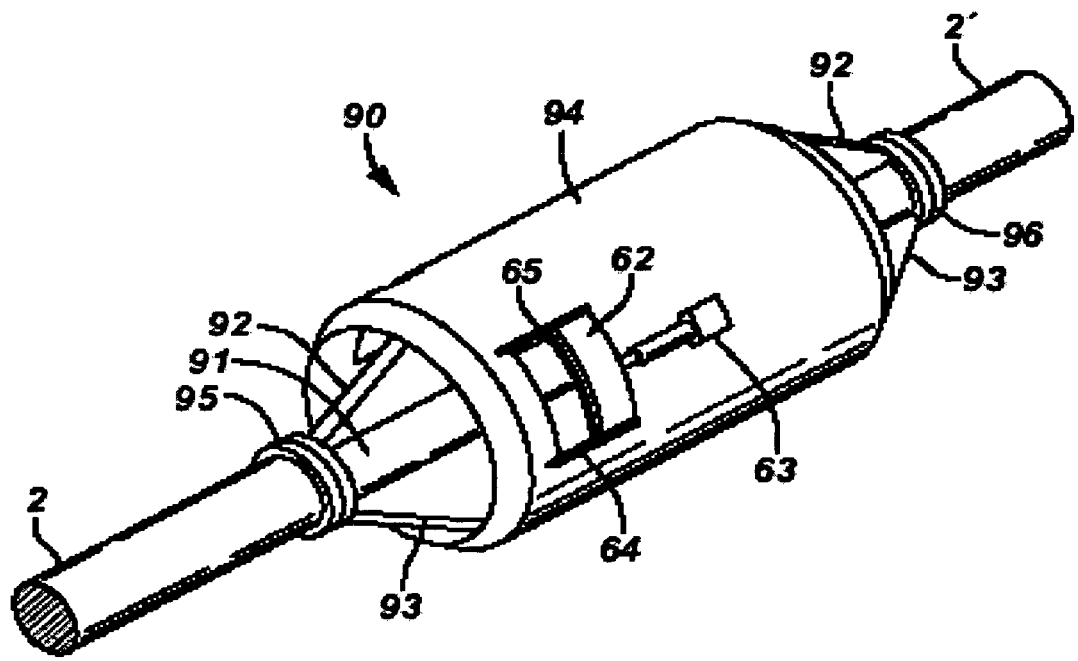
FIG. 9 is a schematic rear perspective view of another apparatus of the invention.
Figure 10:
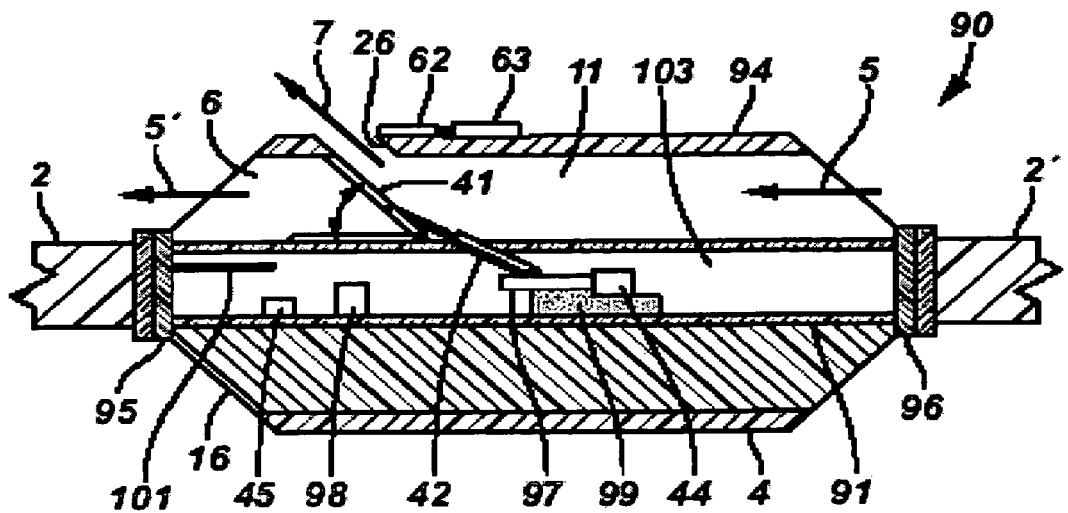
FIG. 10 is a cross-sectional view of another apparatus of the invention.

FIGS. 9 and 10 are rear perspective and cross-sectional views, respectively, of an inline embodiment 90 of the apparatus of the invention. As with embodiment 60 of FIG. 6, this embodiment depicts a slide valve 62 and valve actuator 63, valve 62 riding on rails 64 and 65. An internal, cylindrical body member 91, along with partitions 92 and 93 and external body member 94 form a flow-through duct 11 between body members 91 and 94, while diversion flow outlet duct 26 is essentially a slot in outside body member 94, which may be opened and closed by actuating valve 62 and its actuator 63. A diverting member 41 is positioned within flow-through duct 11, while its actuator 42 may be at least partially positioned within a cavity 103 within internal body member 91, anchored to a support 97, along with its local controller 44. Cavity 103 may also function as a watertight housing for various sensors 45 and pressure sensors 98. The spaces within cavity 103 not occupied by electronics components are typically filled with foam material 99 to reduce noise. Illustrated at 101 is a strength member, as discussed earlier, such as one or more aramid fiber ropes, which may extend the length of internal body member 91 from a first connector 95 to second connector 96, but is shown truncated for clarity in FIG. 10. Connector 95 connects with streamer section 2, while connector 96 connects with streamer section 2'. Connectors 95 and 96 may be flanges, or any other equally functional connectors, such as screwed fittings, clamps, and the like.

In apparatus embodiments of the invention, the front intakes of the device may be designed to contribute a minimum of drag, and are arranged symmetrically so as to not produce any net lateral forces on account of their shape. Furthermore, the use of alternative means for diverting flow in the apparatus is considered within the invention. For example, rather than a flap-type diverting member, the diverting member may take the form of a bladder or bellows that is able to conform to the internal shape of a duct, and which receives air or other fluid when it is desired to close a duct, and expel the fluid when the duct is to be opened to flow. As air is used frequently in seismic sources (for air-guns), the option to use bladders or bellows that may alternately take in and expel a fluid such as air, another gas, or even a liquid, is considered within the confines of the invention, and may contribute to the buoyancy of apparatus of the invention.

In operation, apparatus of the invention may be used in methods of positioning a marine seismic streamer. There may be several ducts placed around the outside of the streamer that may be individually controlled to provide coherent force in a desired direction. Apparatus of the invention may be small, robust, with a minimum of moving parts, and able to be spooled with the streamer. The number of ducts and their volume and internal shape may vary. The angle of deflection $\theta$ of the diversion member may vary. If no steering is required then the diversion member shuts off the diversion flow outlet duct and the water is free to flow through the flow-through ducts and normal outlet ducts without changing its direction of flow. The following calculations illustrate use of the apparatus of the invention.

The following definitions are used.

Direction y is lateral to the streamer, x is parallel to the streamer.

A is the cross-sectional area of the flow-through duct.

V is the velocity of the streamer through the water.

Vx and Vy are velocity of the streamer through the water in y and x directions.

θ is the angle of deflection of the diversion member.

ρ is the water density.

Fy is the lateral force generated on the streamer.

Mass flow $dm/dt = AV\rho$.

Water coming into the tunnel (cross-section area A) has Vx=V, Vy=0 and mass flow dm/dt.

Water being diverted out of the diversion flow outlet duct has Vx=Vcos•, Vy=Vsin•, and mass flow=dm/dt.

The lateral force Fy comes from the constant mass flow in the y axis increasing from 0 to Vsin•: Fy=d/dt (mVy)=Vsin• (dm/dt).

The theoretical maximum lateral force $F_{ymax}$ is given by $F_{ymax} = \bullet AV^2 \sin\bullet$.

The amount of force can be controllably varied using partial opening and closing of the diversion members, and by modifying the duct cross-sectional areas if necessary. Thus apparatus of the invention may be used to augment streamer positioning by more powerful devices by being placed periodically between adjacent steerable birds, for example, every 100 m. In this configuration, apparatus of the invention may be able to reduce "cable sag" between the larger force generating devices. For apparatus of the invention to be self-controlled and stable, they may incorporate one or more sensors that are able to sense the orientation of the apparatus and control the settings of the flow diversion members.

In some embodiments, apparatus of the invention used without a feedback control system may become unstable due to geometry of the streamer, the point of application of, and direction of the applied forces. This may cause the apparatus to generate a torque on the streamer. To remove this undesirable effect, a suitable control system may be utilized. Two possible non-limiting embodiments of this control system are now discussed.

Figure 11:
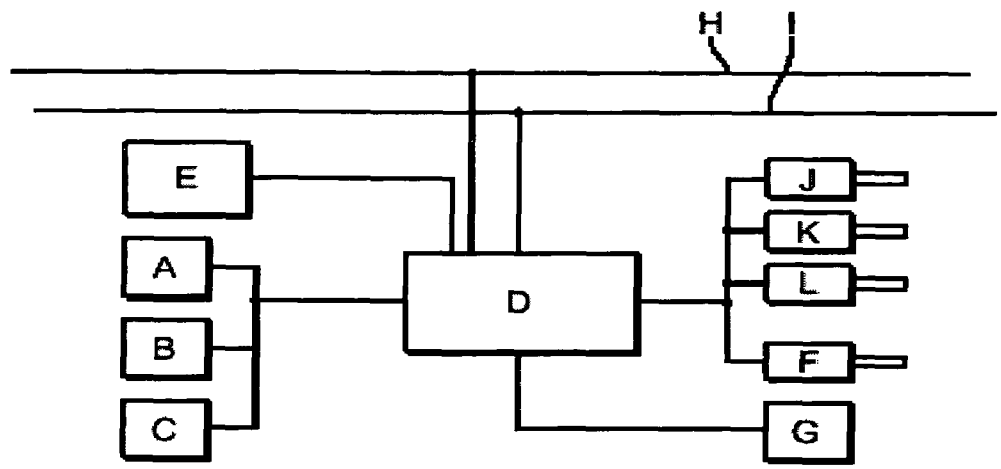
FIG. 11 is a schematic diagram of a control scheme useful with apparatus of the invention.

One option is to include a separate actuator to control the "roll" angle of the apparatus. This may be an electromechanical or hydraulic actuator that is able to rotate the device about the axis of the streamer, and maintain the axial orientation of the apparatus in the presence of destabilizing forces from the exiting water stream(s). This actuator may be controlled using input from sensors (for example accelerometers) that provide orientation information. FIG. 11 presents one control system that might be employed. The control system is described for an apparatus such as depicted in FIG. 1, in other words a symmetrical three-duct apparatus, employing three flow diversion members moved by three actuators, and using a separate fourth actuator for roll control. A, B, and C are sensor systems to determine the positions of the diversion members. A controller D uses input from these sensors, and controls the diversion member actuators J, K and L. Power (H) and data/control signals (I) allow the apparatus to be remotely powered up and communicated with. A battery (E) may be provided to keep the apparatus running in case of main power failure. Controller D, along with an orientation sensor G and roll actuator F form the feedback control system to maintain the desired orientation of the apparatus.

Figure 12:
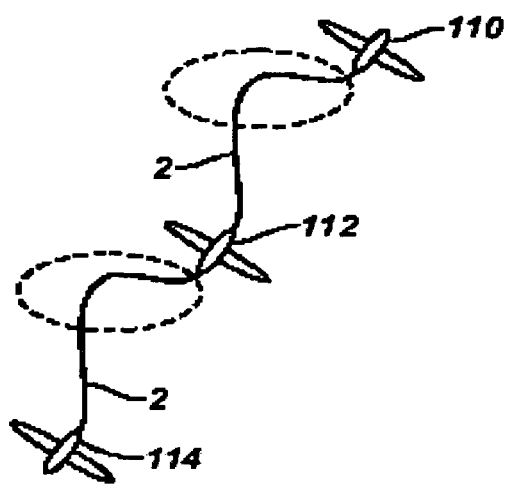
FIG. 12 illustrates schematically a prior art configuration of a streamer with birds attached.
Figure 13:
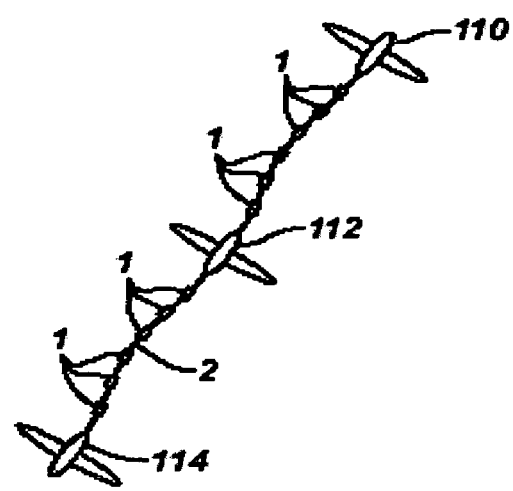
FIG. 13 illustrates schematically the streamer configuration of FIG. 12 modified to include multiple apparatus of the invention positioned between birds.

A second option is to use the fluid stream itself to supply control forces. Directed fluid streams may be used to apply the necessary stabilizing forces. A secondary system of flow diversion members and ducts may be used to control the fluid streams to generate the required forces. Alternatively, it is also possible to include moveable exit nozzles in one or more flow diversion ducts to provide the necessary stability by a scheme of continuous minor adjustments to the exit direction of the fluid from the flow diversion duct. The benefits of this will include reduction in "sag" in the streamer shape between streamer positioning primary devices such as the steerable birds known under the trade designation "Q-FIN", available from WesternGeco, Houston, Tex. When steerable birds are required to exert large amounts of force for steering, it may create undesirable noise in the recorded seismic signal due to drag of the streamer at larger angles though the fluid. Referring to FIG. 12, noisy zones are illustrated in the dotted ovals in FIG. 12—the feather angle is exaggerated. FIG. 12 illustrates three steerable birds 110, 112, and 114 connected inline in a streamer 2 (other details, such as a towing vessel, are not shown). Addition of apparatus of the invention may improve streamer positioning as illustrated schematically in FIG. 13. Application of the apparatus of the invention in conjunction with steerable birds may also increase the feather angle that steerable birds may be able to steer.

With suitable modifications, apparatus of the invention may also be used as an independent means of achieving streamer positioning, although as indicated above, the design may need to be modified by either increasing the size of the ducts, and/or by inclusion of an impeller to increase the speed of the water at the exit of the inclined ducts, or a combination of the two.

Very often water currents vary significantly with depth and two streamers towed at different depths, such as two connected streamers towed in "over/under" configuration, may easily be brought out of the ideal position. To correct for that, apparatus of the invention may be used to enforce a moment on a connected streamer pair. A moment may be accomplished by diverting fluid through two apparatus of the invention (one or more on each streamer of the pair) in such a way so as to move the streamers in opposing directions. In other situations currents induce so-called "feathering" to the streamer pair, or the current may vary along the length of the streamer pair causing the streamer pair to "snake." In such situations, it may be desirable to induce a net force on the streamer pair by commanding all apparatus to divert fluid in the same direction. It is within the invention to provide for both movements, that is, both a moment and a translational movement simultaneously.

Apparatus of the invention may connect to at least one streamer in such a way that it is able to communicate with the outside world, which may be a vessel, satellite, or land-based device. The way this may be accomplished varies in accordance with the amount of energy the apparatus requires and the amount of energy the apparatus is able to store locally in terms of batteries, fuel cells, and the like. If the local storage capacity for batteries, fuels cells, and the like is sufficient, the mount or coupling to the streamer can be similar to the methods used to power so-called "birds" used for steering streamers. These steerable birds may be clamped onto the streamer skin at locations where there is located an inductor inside the streamer skin. Similarly, apparatus of the invention may be clamped onto the streamer skin at such locations. Then the apparatus and the streamer can communicate through the skin with electrical impulses.

If, on the other hand, the apparatus needs charging power from the streamer a different approach is required. In this case the apparatus may be mounted between two streamer sections and as such comprise an insert between two streamer sections, as described herein.

It is also within the invention to combine apparatus of the invention with one or more other control devices, such as "birds." One type of bird useful in the invention is described in commonly assigned U.S. Pat. No. 6,671,223, describing a steerable bird that is designed to be electrically and mechanically connected in series with a streamer. One embodiment of this bird has two opposed wings that are independently controllable in order to control a streamer's lateral position as well as its depth. Other birds useful in the invention include battery-powered birds suspended beneath the streamer and including a pair of laterally projecting wings, the combination of streamers, elongate member, orientation member, and birds being arranged to be neutrally buoyant. Clamp-on birds, as discussed previously, may also be employed. Birds useful in the invention, including suspended birds, in-line birds, and clamp-on birds may include on-board controllers and/or communications devices, which may be microprocessor-based, to receive control signals representative of desired depth, actual depth, desired lateral position, actual lateral position and roll angle of the bird. The on-board controllers in apparatus of the invention may communicate with local controllers mounted on birds, and/or communicate with remote controllers. Apparatus of the invention may include depth sensors mounted in or on the apparatus. Lateral positioning signals may be derived from a position determining system, such as GPS or other system. The controller may control electrical stepper motors or pneumatic or hydraulic motors, each operatively connected to one of the flow diversion members. The motors may produce signals representative of their respective current angular positions (and therefore the angular positions of the flow diversion members), which outputs may be connected to respective control inputs of the apparatus control circuit. Apparatus of the invention may include an inclinometer mounted in or on the apparatus to produce a roll angle signal. In operation, the control circuit may receive signals indicative of the difference between actual and/or desired depths of the streamer, and the difference between the actual and desired lateral position of the streamer. One or both difference signals may be used by the control circuit to calculate the angle θ required for one or more flow diversion members which will together produce the necessary combination of vertical force (upwardly or downwardly) and/or lateral force (left or right) required to move the streamer to the desired depth and/or lateral position in cooperation with one or more birds. Optionally, one or more birds may work in tandem with the controller and control scheme on-board apparatus of the invention as described in reference to FIG. 11. For example, the control schemes could be cascaded.

Materials of construction of apparatus of the invention may vary. However, there may be a need to balance the apparatus with the remainder of the seismic equipment so that the system is balanced to be neutrally buoyant in the fluid (usually seawater) or nearly so, to perform its intended function. Polymeric composites, with appropriate fillers used to adjust buoyancy and mechanical properties as desired, may be employed.

In use the position of a streamer may be actively controlled by GPS or other position detector sensing the position of the streamer, and acoustic sensors or other means may sense the orientation the streamer and feed this data to navigation and control systems. Alternatively, data may be fed-forward to local controllers on apparatus of the invention. Gross positioning and local movement of the streamer may be controlled on board a tow vessel, on some other vessel, locally, or indeed a remote location. By using a communication system, either hardwire or wireless, information from the remote controller may be sent to one or more local controllers on apparatus of the invention and, when present and when desired, one or more birds. The local controllers in turn are operatively connected to adjustment mechanisms comprising motors or other motive power means, and actuators and couplers connected to the flow diversion members, and, if present, birds, which function to move the apparatus as desired. This in turn adjusts the position of the streamer, causing it to move as desired. Feedback control may be achieved using local sensors positioned as appropriate depending on the specific embodiment used, which may inform the local and remote controllers of the position of one or more flow diversion members, distance between streamers, a position of an actuator, the status of a motor or hydraulic cylinder, the orientation of an apparatus in reference to the streamer, and the like. A computer or human operator can thus access information and control the entire positioning effort, and thus obtain much better control over the seismic data acquisition process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6, unless "means for" is explicitly recited together with an associated function without any structure being recited. "Means for" clauses are intended to cover the structures described herein as performing the recited function and not only structural equivalents, but also equivalent structures. Thus, although a piston/cylinder actuator and a rack and pinion actuator may not be structural equivalents in that a piston/cylinder actuator employs a piston moveable inside a cylinder, whereas a rack and pinion apparatus employs a gearing arrangement, in the environment of effecting movement of a flow diversion member to control fluid flow, a piston/cylinder actuator and a rack and pinion actuator may be equivalent structures.

What is claimed is:

1. An apparatus comprising a body for connecting to a seismic streamer, the body defining at least one flow passage there through, and a diverter for selectively adjusting flow through the flow passage, the body comprising an external body, the external body having an inlet end, an outlet end, a longitudinal axis generally parallel to a streamer axis, and a diameter larger than a diameter of the streamer, wherein the at least one flow passage comprises at least one flow-through duct defined by the external body and an internal member selected from a portion of the streamer and a connector;

wherein the body comprises the internal member extending from the inlet end to the outlet end, the flow-through duct fluidly connected to a normal flow outlet duct and a diversion flow outlet duct angled away from the longitudinal axis of the streamer, and including a controllable flow diversion member in at least one of the outlet ducts; and including a propulsion booster in the flow diversion duct to provide additional thrust to move a streamer.

2. The apparatus of claim 1 comprising a plurality of flow-through ducts and corresponding flow diversion members, wherein the flow diversion members comprises a metal or plastic flap operatively connected to the internal member or the external body, and able to be moved in accordance with a desired amount of flow to be diverted through diversion flow outlet ducts associated with each flow-through duct.

3. The apparatus of claim 2 wherein the flow diversion members are adapted to move independently.

4. The apparatus of claim 2 wherein each flow diversion member is adapted to move in conjunction with the other flow diversion members.

5. The apparatus of claim 4 wherein the internal member is a portion of the streamer, the external body comprises an essentially hollow cylinder and a plurality of partitions extending inwardly there from to the streamer, the flow-through ducts defined by cavities between the external body, the portion of the streamer, and the partitions.

6. The apparatus of claim 1 wherein the flow-through ducts are tunnels or channels in the external body, and the internal member is a portion of a streamer.

7. The apparatus of claim 6 wherein the external body is releasably secured to the portion of the streamer via mounting elements adjacent an inductor inside the streamer.

8. The apparatus of claim 1 wherein the internal member is a connector between two streamer elements.

9. The apparatus of claim 1 including connections that allow the apparatus to rotate relative to the streamer.

10. The apparatus of claim 8 wherein the connector comprises an internal cavity.

11. The apparatus of claim 8 including connections to the streamer that allow the apparatus to rotate relative to the streamer elements.

12. The apparatus of claim 1 wherein: (a) the internal member comprises a first portion connecting a first seismic streamer portion and a second portion connecting a second seismic streamer portion, the first and second seismic streamer portions comprising a seismic streamer; (b) the external body comprises a diameter larger than a diameter of the internal member, the external body connected to the internal member by a plurality of partitions; and (c) the at least one flow-through duct comprising a plurality of flow-through ducts defined between the external body, the internal member, and the partitions, each flow-through duct having one entry port and at least two exit ports.

13. The apparatus of claim 12 wherein the internal body includes a hollow portion.

14. The apparatus of claim 12 wherein the flow-through ducts comprise three flow-through ducts arranged in a symmetrical pattern 120 degrees around a circumference of the apparatus, each flow-through duct feeding a normal exit duct leading to one exit port, and a diversion flow duct angled away from the streamer longitudinal axis and leading to a second exit port.

15. The apparatus of claim 13 wherein the hollow portion houses an electronics module.

16. The apparatus of claim 15 wherein the electronics module includes a micro-controller-based control system adapted to acquire data from one or more sensors.

17. The apparatus of claim 16 wherein said one or more sensors includes one or more sensors adapted to sense orientation of the apparatus.

18. The apparatus of claim 17 wherein the electronics module includes one or more controllers adapted to control said means for adjusting direction of flow of water through each exit port.

19. The apparatus of claim 13 wherein the hollow portion includes one or more sensors.

20. The apparatus of claim 19 wherein the sensors are selected from hydrophones and geophones.

21. An apparatus comprising a body for connecting to a seismic streamer, the body defining at least one flow passage there through, and a diverter for selectively adjusting flow through the flow passage, the body comprising an external body, the external body having an inlet end, an outlet end, a longitudinal axis generally parallel to a streamer axis, and a diameter larger than a diameter of the streamer, wherein the at least one flow passage comprises at least one flow-through duct defined by the external body and an internal member selected from a portion of the streamer and a connector;
wherein the body comprises the internal member extending from the inlet end to the outlet end, the flow-through duct fluidly connected to a normal flow outlet duct and a diversion flow outlet duct angled away from the longitudinal axis of the streamer, and including a controllable flow diversion member in at least one of the outlet ducts; and
including a propulsion booster in the flow diversion duct to provide additional thrust to move a
wherein the propulsion booster is an impeller.

22. An apparatus comprising a body for connecting to a seismic streamer, the body defining at least one flow massage there through, and a diverter for selectively adjusting flow through the flow passage, the body comprising an external body, the external body having an inlet end, an outlet end, a longitudinal axis generally parallel to a streamer axis, and a diameter larger than a diameter of the streamer, wherein the at least one flow passage comprises at least one flow-through duct defined by the external body and an internal member selected from a portion of the streamer and a connector;
wherein the body comprises the internal member extending from the inlet end to the outlet end, the flow-through duct fluidly connected to a normal flow outlet duct and a diversion flow outlet duct angled away from the longitudinal axis of the streamer, and including a controllable flow diversion member in at least one of the outlet ducts;
wherein the internal member is a connector between two streamer elements;
including connections to the streamer that allow the apparatus to rotate relative to the streamer elements; and
wherein the one or more outlet ducts includes a propulsion booster to provide additional thrust to move a steamer.

23. An apparatus comprising a body for connecting to a seismic streamer, the body defining at least one flow passage there through, and a diverter for selectively adjusting flow through the flow passage, the body comprising an external body, the external body having an inlet end, an outlet end, a longitudinal axis generally parallel to a streamer axis, and a diameter larger than a diameter of the streamer, wherein the at least one flow passage comprises at least one flow-through duct defined by the external body and an internal member selected from a portion of the streamer and a connector;

wherein the body comprises the internal member extending from the inlet end to the outlet end, the flow-through duct fluidly connected to a normal flow outlet duct and a diversion flow outlet duct angled away from the longitudinal axis of the streamer, and including a controllable flow diversion member in at least one of the outlet ducts;

wherein the internal member is a connector between two streamer elements;

including connections to the streamer that allow the apparatus to rotate relative to the streamer elements;

wherein the one or more outlet ducts includes a propulsion booster to provide additional thrust to move a steamer; and wherein the propulsion booster is a motor-driven impeller.

24. An apparatus comprising a body for connecting to a seismic streamer, the body defining at least one flow passage there through, and a diverter for selectively adjusting flow through the flow passage, the body comprising an external body, the external body having an inlet end, an outlet end, a longitudinal axis generally parallel to a streamer axis, and a diameter larger than a diameter of the streamer, wherein the at least one flow passage comprises at least one flow-through duct defined by the external body and an internal member selected from a portion of the streamer and a connector;

wherein the body comprises the internal member extending from the inlet end to the outlet end, the flow-through duct fluidly connected to a normal flow outlet duct and a diversion flow outlet duct angled away from the longitudinal axis of the streamer, and including a controllable flow diversion member in at least one of the outlet ducts;

wherein: (a) the internal member comprises a first portion connecting a first seismic streamer portion and a second portion connecting a second seismic streamer portion, the first and second seismic streamer portions comprising a seismic streamer; (b) the external body comprises a diameter larger than a diameter of the internal member, the external body connected to the internal member by a plurality of partitions; and (c) the at least one flow-through duct comprising a plurality of flow-through ducts defined between the external body, the internal member, and the partitions, each flow-through duct having one entry port and at least two exit ports;

including an impeller in one or more of the exit ports.

* * * * *